(12) United States Patent
Weksler et al.

(10) Patent No.: US 9,430,303 B2
(45) Date of Patent: Aug. 30, 2016

(54) SIMULTANEOUS DATA COPY OPERATION

(71) Applicant: LENOVO (Singapore) PTE, LTD., New Tech Park (SG)

(72) Inventors: Arnold S. Weksler, Raleigh, NC (US); Neal Robert Caliendo, Jr., Raleigh, NC (US); Antonio Bumarch, III, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 184 days.

(21) Appl. No.: 14/085,555

(22) Filed: Nov. 20, 2013

(65) Prior Publication Data
US 2015/0143233 A1    May 21, 2015

(51) Int. Cl.
*G06F 17/00* (2006.01)
*G06F 9/54* (2006.01)
*G06F 17/24* (2006.01)

(52) U.S. Cl.
CPC ............... *G06F 9/543* (2013.01); *G06F 17/24* (2013.01)

(58) Field of Classification Search
None
See application file for complete search history.

(56) References Cited

U.S. PATENT DOCUMENTS

| 7,853,888 B1* | 12/2010 | Dhawan et al. ............... 715/770 |
| 2005/0102629 A1* | 5/2005 | Chen et al. .................... 715/770 |
| 2005/0240866 A1* | 10/2005 | Berstis .................... G06F 9/543 715/248 |
| 2007/0226713 A1* | 9/2007 | McGowan et al. ........... 717/147 |

* cited by examiner

*Primary Examiner* — Keith Bloomquist
(74) *Attorney, Agent, or Firm* — Kunzler Law Group

(57) ABSTRACT

An apparatus for inserting selected data from a source electronic document to a target electronic document includes a location tracking module and a data module. The location tracking module stores a location of a data insertion point within the target document. The data module inserts selected data from the source document at the data insertion point within the target document.

17 Claims, 6 Drawing Sheets

SIMULTANEOUS DATA COPY OPERATION

FIELD

The subject matter disclosed herein relates to simultaneous data copy operations and more particularly relates to simultaneous data copy operation from a source electronic document to one or more target electronic documents.

BACKGROUND

Description of the Related Art

Traditional cut-and-paste or copy-and-paste operations with electronic documents require users to find leave the target document, select data within the source document, navigate back to the position where the selected data will be pasted, and paste the selected data. To cut-and-paste or copy-and-paste data from multiple sources to multiple target documents requires constant switching between source and target documents, increasing the amount of time spent and the possibility of human error. Manual switching between documents may also be time consuming and result in errors, especially if there are a lot of open windows and/or documents on an electronic device.

BRIEF SUMMARY

An apparatus for inserting selected data from a source electronic document to a target electronic document is disclosed. A method and computer program product also perform the functions of this apparatus.

An apparatus for inserting selected data from a source electronic document to a target electronic document includes a location tracking module and a data module. In one embodiment, the apparatus also has a viewing module. The location tracking module stores a location of a data insertion point within the target document. In one embodiment, the location of the data insertion point is the location of the cursor within the target document, the location of the mouse pointer within the target document, or the location of a touch gesture within the target document.

The data module inserts selected data from the source document at the data insertion point within the target document. In one embodiment, the data module inserts selected data from one or more other source documents at the data insertion point within the target document. In another embodiment, the location tracking module stores a location of one or more other data insertion points within a second target document and the data module inserts selected data from the source document at the one or more other data insertion points.

The viewing module switches between the target document and the source document in response to the location tracking module storing the location of the data insertion point within the target document or the data module inserting selected data from the target document to the source document. In a certain embodiment, the source document is the most recent document whose data has been inserted into the target document. In one embodiment, the viewing module automatically switches from the target document to the source document in response to the location tracking module storing the location of the data insertion point within the target document. In another embodiment, the viewing module automatically switches from the source document to the target document in response to the data module inserting selected data from the source document at the data insertion point.

A method for inserting selected data from a source electronic document to a target electronic document includes storing a location of a data insertion point within a target document and inserting selected data from a source document at the data insertion point within the target document. In one embodiment, the method also includes inserting selected data from one or more other source documents at the data insertion point within the target document. In another embodiment, the method also includes storing a location of one or more other data insertion points within a second target document and inserting selected data from the source document at the one or more other data insertion points. In a certain embodiment, the location of the data insertion point is the location of a cursor within the target document, the location of a mouse pointer within the target document, or the location of a touch gesture within the target document.

In one embodiment, the method also includes switching between the target document and the source document in response to storing the location of the data insertion point or inserting selected data from the source document at the data insertion point within the target document. In some embodiments, the method also includes automatically switching from the target document to the source document in response to storing the location of the data insertion point within the target document. In other embodiments, the method also includes automatically switching from the source document to the target document in response to inserting selected data from the source document at the data insertion point.

A computer program product includes a computer readable storage medium storing machine readable code executable by a process to store a location of a data insertion point within a target document and insert selected data from a source document at the data insertion point within the target document. In one embodiment, the computer program product also includes inserting selected data from one or more other source documents at the data insertion point within the targeted document. In another embodiment, the computer program product also includes storing a location of one or more other data insertion points within a second target document and inserting selected data from the source document at the one or more other data insertion points. In some embodiments, the location of the data insertion point is the location of a cursor within the target document, the location of a mouse pointer within the target document, or the location of a touch gesture within the document. In certain embodiments, the computer program product also includes switching between the target document and the source document in response to storing the location of the data insertion point within the target document and inserting selected data from the source document at the data insertion point.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
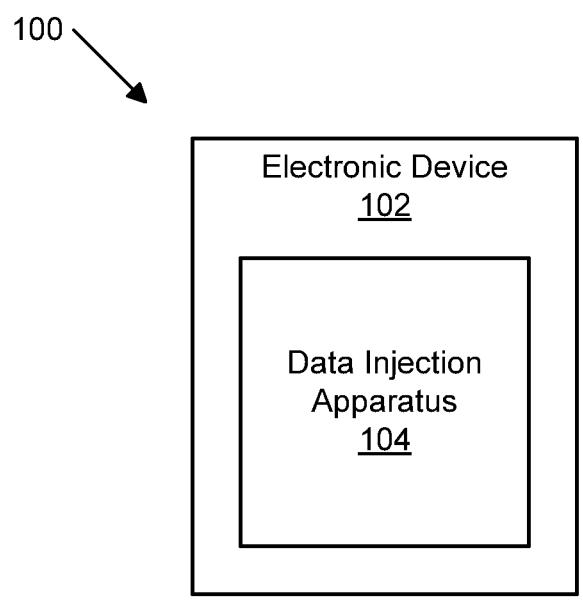
FIG. 1 is a schematic block diagram illustrating one embodiment of a system for inserting selected data from a source electronic document to a target electronic document.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

FIG. 1 is a schematic block diagram illustrating one embodiment of a system 100 for inserting selected data from a source electronic document to a target electronic document. The system 100 includes an electronic device 102 having a data injection apparatus 104, which are described below.

The system 100 includes an electronic device 102 that inserts selected data from a source electronic document to one or more target electronic documents using a data injection apparatus 104. The electronic device 102 may be any electronic device capable of creating and/or editing an electronic document. For example, the electronic device 102 may be a desktop computer, laptop computer, tablet computer, or smartphone. The source and target electronic documents may be any electronic document capable of being displayed on an electronic device 102. In one embodiment, the source and target electronic documents contain text, images, and/or videos. In another embodiment, the source and target electronic documents contain charts, shapes, symbols, and/or hyperlinks. In still another embodiment, the source and target electronic documents contain embedded software objects (e.g., Java applet). In one instance, the source and target electronic documents are of the same file type. In another instance, the source and target electronic documents are of different file types. Examples of the different file types include, without limitation, text files, PDFs, CAD files, and web pages.

Figure 2:
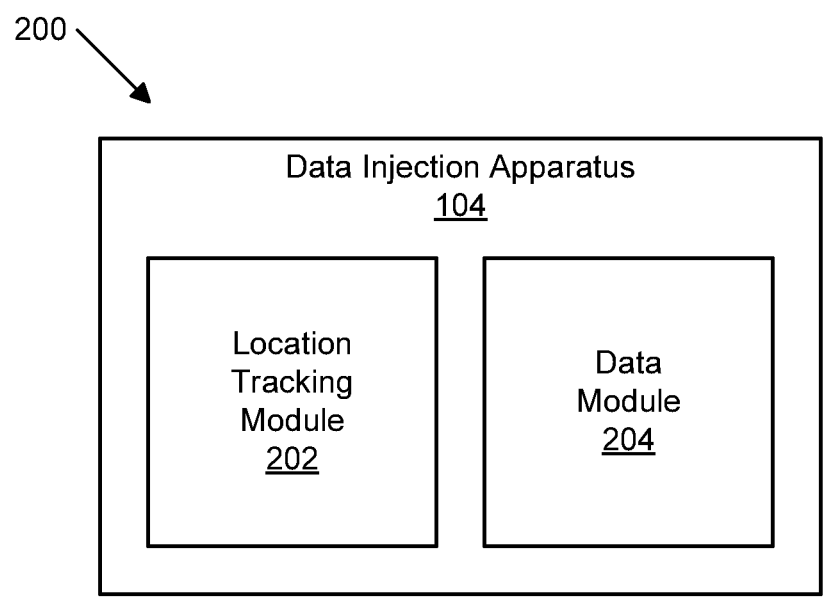
FIG. 2 is a schematic block diagram illustrating one embodiment of an apparatus for inserting selected data from a source electronic document to a target electronic document.

FIG. 2 is a schematic block diagram illustrating one embodiment of an apparatus 200 for inserting selected data from a source electronic document to a target electronic document. The apparatus 200 includes one embodiment of a data injection apparatus 104 with a location tracking module 202 and a data module 204, which are described below.

The location tracking module 202 stores a location of a data insertion point within a target document in response to user input. The user input may take various forms. In one instance, the user input is one or more keystrokes (e.g., SHIFT-ALT-P). In another instance, the user input is one or more mouse clicks or touch gestures within the target document displayed by the electronic device 102. The data insertion point may be determined in various ways. In one embodiment, the data insertion point is the current location of the cursor within the target document. In another embodiment, the data insertion point is the current location of the mouse pointer within the target document. In yet another embodiment, the data insertion point is the last location within the target document where a touch input was registered by the electronic device 102.

In one embodiment, the location tracking module 202 stores the locations of multiple data insertion points within one or more target documents. For example, the location tracking module 202 may store the locations of two data insertions points within a word processing document and the location of another data insertion point within a different word processing document. As another example, the location tracking module 202 may store the locations of two data insertion points within a spreadsheet document, the location of another data insertion point within an e-mail, and the location of yet another data insertion point within a desktop publishing application document. The location tracking module 202, in one embodiment, stores the location(s) of one or more data insertion points in an index. The index of data insertion points may be organized in various ways. In one example, the index is organized by document name or another type of document identifier. In another example, the index is organized by document file type. In still another example, the index is organized by software application type used to create and/or edit the target document.

The data insertion point index, in one embodiment, is accessible to all software applications on the electronic device 102. For example, a user may access the index from within any software application on the electronic device 102 in order to insert data at the one or more data insertion points stored within the index. In some embodiments, the index stores data insertion points persistently so that selected data from multiple locations within a source document or multiple source documents may be copied to the stored data insertion points.

The data module 204 inserts selected data from a source document at the location of the data insertion point within the target document in response to user input. The user input may take various forms. In one instance, the user input is one or more keystrokes to select data within the source document. In another instance, the user input is one or more mouse movements or touch gestures within the source document displayed by the electronic device 102. In one instance, the data module 204 removes the selected data from the source document and inserts it into the target document. In another instance, the data module 204 only copies the selected data from the source document and inserts it into the target document.

In one embodiment, the data module 204 inserts selected data from the source document at the locations of multiple data insertion points within one or more target documents. In one example, the data module 204 can insert selected data from the source document at two data insertion points within a target document. As another example, the data module 204 inserts the selected data from the source document at data insertion points within two or more separate target documents. In some embodiments, the data module 204 inserts selected data from the source document at each of the data insertion points stored within the index of data insertion points. In other embodiments, the data module 204 inserts the selected data at only a subset of the data insertion points stored within the index. In one instance, the data module 204 only inserts the selected data from the source document at data insertion points selected by a user. In this instance, the data module 204 presents a list of data insertion points that a user may choose from to insert the selected data. In another instance, the data module automatically inserts the selected data from the source document at data insertion points within one or more target documents whose file type matches the source document file type.

Figure 3:
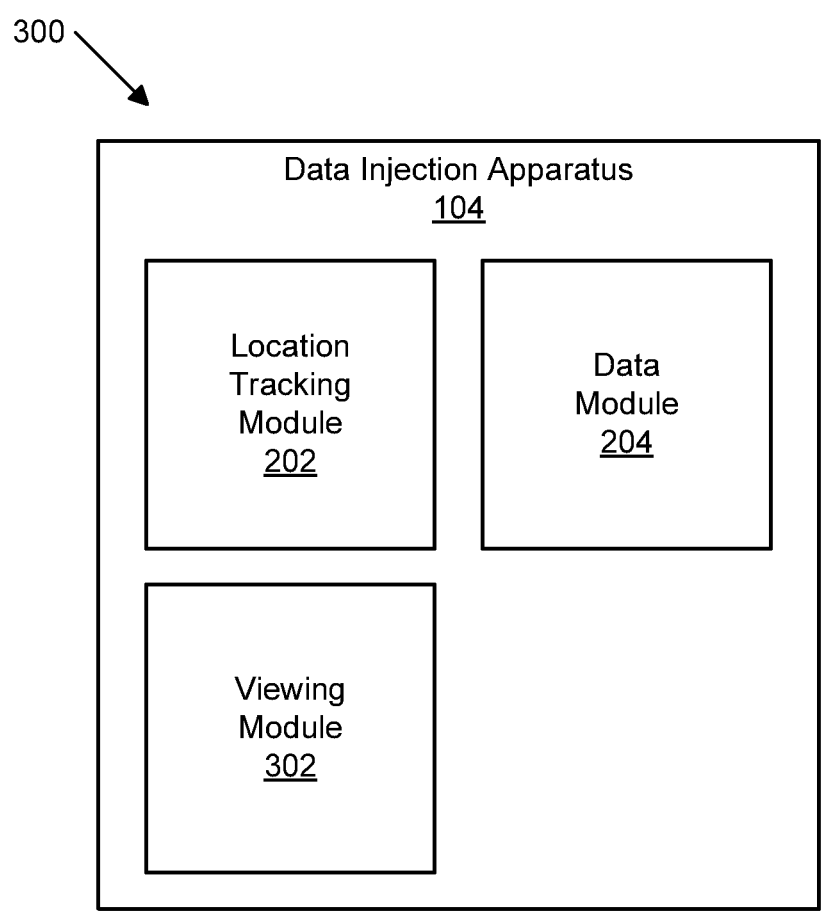
FIG. 3 is a schematic block diagram illustrating another embodiment of an apparatus for inserting selected data from a source electronic document to a target electronic document.

FIG. 3 is a schematic block diagram illustrating another embodiment of an apparatus for inserting selected data from a source electronic document to a target electronic document. The apparatus 300 includes another embodiment of a data injection apparatus 104 with a location tracking module 202 and a data module 204, which are substantially similar to those described above in relation to apparatus 200 in FIG. 2. The apparatus 300 also includes a viewing module 302, described below.

The viewing module 302 switches between the target document and the source document in response to the location tracking module 202 storing the location of the data insertion point within the target document or the data module 204 inserting selected data from the source document at the data insertion point. The viewing module 302 switches from the target document to the source document in response to the location tracking module 202 storing the location of the data insertion point within the target document. In one embodiment, the viewing module 302 automatically switches from the target document to the source document in response to the location tracking module 202 storing the location of the data insertion point within the target document. In this embodiment, the source document is chosen based on one or more criterion. For instance, the source document may be the most recent document, open or closed, whose data has been inserted into the target document. In another instance, the source document may be the most recent document, open or closed, whose data has been inserted into any target document. In still another instance, the source document may be the open document whose data has been most recently inserted into the target document. In yet another instance, the source document may be the open document whose data has been most recently inserted into any target document. It is possible that the target document is also the source document. In some embodiments, the viewing module 302 presents a user with a list of possible source documents in response to the location tracking module 202 storing the location of the data insertion point within the target document and switches to the source document selected by the user. In this embodiment, the list of possible source documents may be a list of all open documents, a list of the most recent documents whose data was copied or cut/pasted to other documents, or a combination thereof.

The viewing module 302 also switches from the source document to the target document in response to the data module 204 inserting selected data from the source document to the target document. In one embodiment, the viewing module 302 automatically switches from the source document to the target document in response to the data module 204 inserting selected data from the source document to the target document. In this embodiment, the target document may be chosen using one or more criterion. In one instance, the target document is the document containing the most recently created data insertion point. In another instance, the target document is the document containing the largest number of data insertion points. In still another instance, the target document is the document having the same file type as the source document. It is possible that the source document is also the target document. In certain embodiments, the viewing module 302 presents a user with a list of target documents in response to the data module 204 inserting selected data from the source document to the target document and switches to the target document selected by the user. In these embodiments, the list of target documents is the list of all documents having at least one data insertion point.

Figure 4:
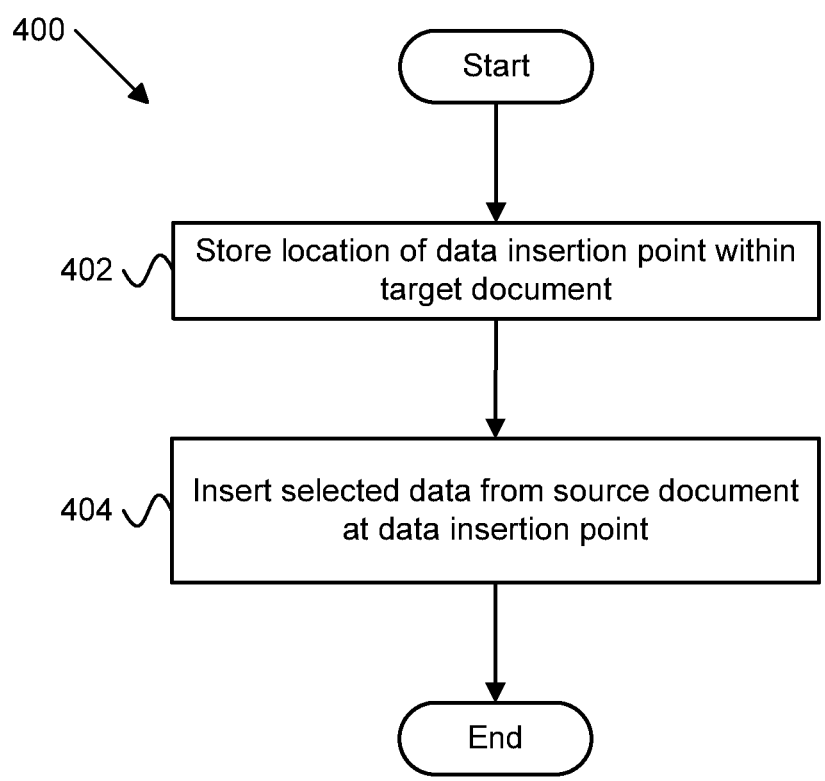
FIG. 4 is a schematic flow chart diagram illustrating one embodiment of a method for inserting selected data from a source electronic document to a target a electronic document.

FIG. 4 is a schematic flow chart diagram illustrating one embodiment of a method 400 for inserting selected data from a source electronic document to a target electronic document. The method 400 begins and stores 402 a location of one or more data insertion points within one or more target documents. In one embodiment, the method 400 stores 402 the location of one or more data insertion points within an index that is accessible to all software applications on the electronic device 102. The method 400 inserts 404 selected data from a source document at the one or more data insertion points and the method 400 ends. In one embodiment, the method 400 inserts 404 selected data from a source document at all the data insertion points and the method 400 ends. In an alternate embodiment, the method 400 inserts 404 selected data from a source document at a subset of the one or more data insertion points and the method 400 ends.

Figure 5:
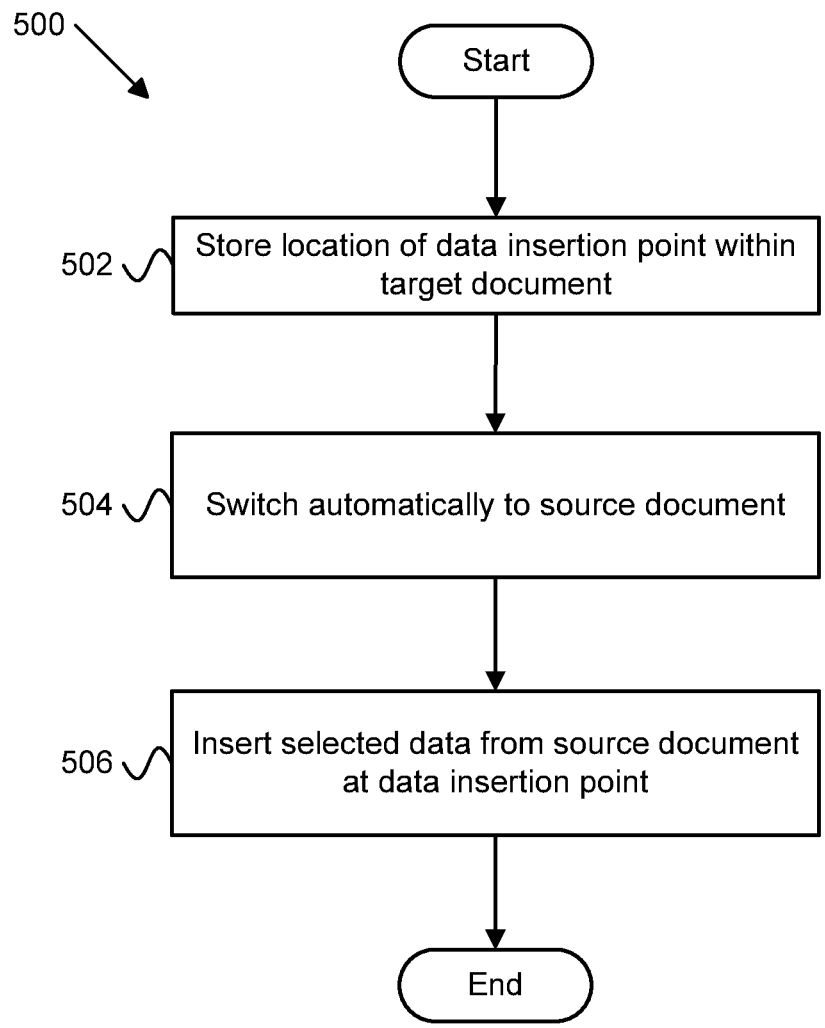
FIG. 5 is a schematic flow chart diagram illustrating another embodiment of a method for inserting selected data from a source electronic document to a target electronic document.

FIG. 5 is a schematic flow chart diagram illustrating another embodiment of a method 500 for inserting selected data from a source electronic document to a target electronic document. The method 500 begins and stores 502 a location of one or more data insertion points within one or more target documents. In one embodiment, the method 500 stores 502 the location of one or more data insertion points within an index that is accessible to all software applications on the electronic device 102. The method 500 automatically switches 504 from the target document to the source document in response to the location tracking module 202 storing the location of one or more data insertion points. In one instance, the source document is the most recent document, open or closed, whose data has been inserted into the target document. In another instance, the source document is the most recent document, open or closed, whose data has been inserted into any target document. In still another instance, the source document is the open document whose data has been most recently inserted into the target document. In yet another instance, the source document is the open document whose data has been most recently inserted into any target document. The method 500 inserts 506 selected data from the source document at the one or more data insertion points and the method 500 ends. In one embodiment, the method 500 inserts 506 selected data from the source document at all the data insertion points and the method 500 ends. In an alternate embodiment, the method 500 inserts 506 selected data from the source document at a subset of the one or more data insertion points and the method 500 ends.

Figure 6:
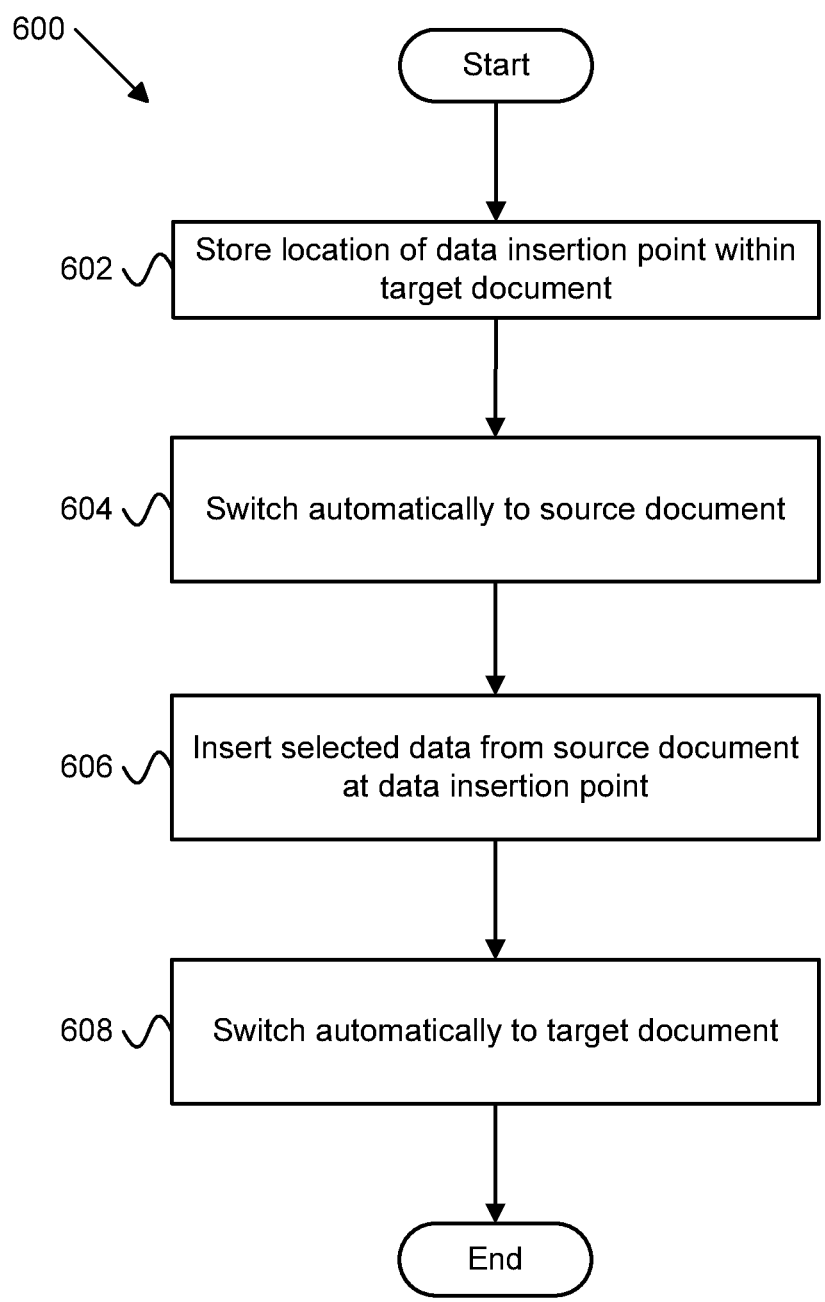
FIG. 6 is a schematic flow chart diagram illustrating still another embodiment of a method for inserting selected data from a source electronic document to a target electronic document.

FIG. 6 is a schematic flow chart diagram illustrating yet another embodiment of a method 600 for inserting selected data from a source electronic document to a target electronic document. The method 600 begins and stores 602 a location of one or more data insertion points within one or more target documents. In one embodiment, the method 600 stores 602 the location of one or more data insertion points within an index that is accessible to all software applications on the electronic device 102. The method 600 automatically switches 604 from the target document to the source document in response to the location tracking module 202 storing the location of one or more data insertion points. In one instance, the source document is the most recent document, open or closed, whose data has been inserted into the target document. In another instance, the source document is the most recent document, open or closed, whose data has been inserted into any target document. In still another instance, the source document is the open document whose data has been most recently inserted into the target document. In yet another instance, the source document is the open document whose data has been most recently inserted into any target document. The method 600 inserts 606 selected data from the source document at the one or more data insertion points. In one embodiment, the method 600 inserts 606 selected data from the source document at all the data insertion points. In an alternate embodiment, the method 600 inserts 606 selected data from the source document at a subset of the one or more data insertion points. The method 600 automatically switches 608 from the source document to the target document in response to the data module 204 inserting selected data from the source document to the one or more data insertion points and the method 600 ends. In one instance, the target document is the document containing the most recently created data insertion point. In another instance, the target document is the document containing the largest number of data insertion points. In still another instance, the target document is the document having the same file type as the source document.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a location tracking module that stores a location of a plurality of data insertion points within a plurality of target documents, wherein the plurality of target documents comprise documents of a plurality of file types;
   a viewing module that switches from a target document to a source document in response to the location tracking module storing the location of a data insertion point at the target document; and
   a data module that automatically inserts selected data from a source document at one or more data insertion points within one or more target documents of the plurality of target documents whose file type matches the source document file type;
   wherein the viewing module presents a user with a list of target documents in response to the data module inserting the selected data,
   wherein the location tracking module and the data module comprise one or more of semiconductor hardware, a memory storing computer readable code, and a processor executing the computer readable code.

2. The apparatus of claim 1, wherein the data module inserts selected data from one or more other source documents at the one or more data insertion points within the one or more target documents.

3. The apparatus of claim 1, wherein the locations of the plurality of data insertion points is stored in response to user input, wherein the user input is selected from a group consisting of a mouse click and a touch gesture.

4. The apparatus of claim 1, wherein the apparatus is located at an electronic device, wherein the location module stores the locations of the plurality of data insertion points within the plurality of target documents in an index of data insertion points, and wherein the index of data insertion data points is accessible to all software applications running on the electronic device.

5. The apparatus of claim 1, wherein the viewing module switches to a target document from the list of target documents selected by the user.

6. The apparatus of claim 1, wherein the source document comprises the most recent document whose data has been inserted into one or more of the plurality of target documents.

7. The apparatus of claim 1, wherein the list of target documents is a list of all documents having at least one data insertion point.

8. A method comprising:
   storing a location of a plurality of data insertion point within a plurality of target documents, wherein the plurality of target documents comprise documents of a plurality of file types;
   switching from a target document to a source document in response to storing the location of a data insertion point in the target document;
   automatically inserting selected data from a source document at one or more data insertion points within one or more target documents of the plurality of target documents whose file type matches the source document file type, and
   presenting a user with a list of target documents in response to inserting the selected data.

9. The method of claim 8, further comprising inserting selected data from one or more other source documents at the one or more data insertion points within the one or more targeted documents.

10. The method of claim 8, wherein the locations of the plurality of data insertion points is stored in response to user input, wherein the user input is selected from a group consisting of a mouse click and a touch gesture.

11. The method of claim 8, further comprising switching to a target document from the list of target documents selected by the user.

12. The method of claim 8, wherein the source document comprises the most recent document whose data has been inserted into one or more of the plurality of target documents.

13. The method of claim 8, wherein the list of target documents is a list of all documents having at least one data insertion point.

14. A program product comprising a non-transitory computer readable storage medium storing computer readable code executable by a processor to perform:
   storing a location of a plurality of data insertion point within a plurality of target documents, wherein the plurality of target documents comprise documents of a plurality of file types;
   switching from a target document to a source document in response to storing the location of a data insertion point in the target document;
   automatically inserting selected data from a source document at one or more data insertion points within one or more target documents of the plurality of target documents whose file type matches the source document file type, and
   presenting a user with a list of target documents in response to inserting the selected data.

15. The program product of claim 14, further comprising inserting selected data from one or more other source documents at the one or more data insertion points within the one or more target documents.

16. The program product of claim 14, wherein the locations of the plurality of data insertion points is stored in response to user input, wherein the user input is selected from a group consisting of a mouse click and a touch gesture.

17. The program product of claim 14, further comprising switching to a target document from the list of target documents selected by the user.

\* \* \* \* \*